April 9, 1940.  F. S. WHEELER  2,196,405
DEVICE FOR MATCHING OR SORTING OBJECTS
Filed Sept. 23, 1937
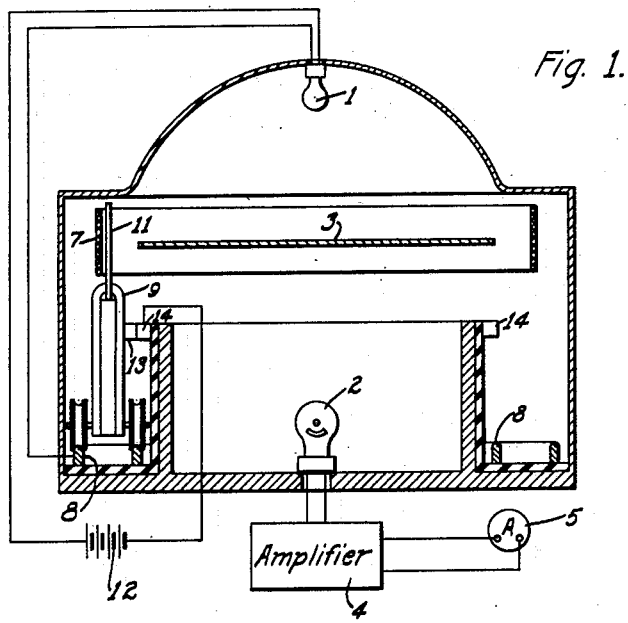
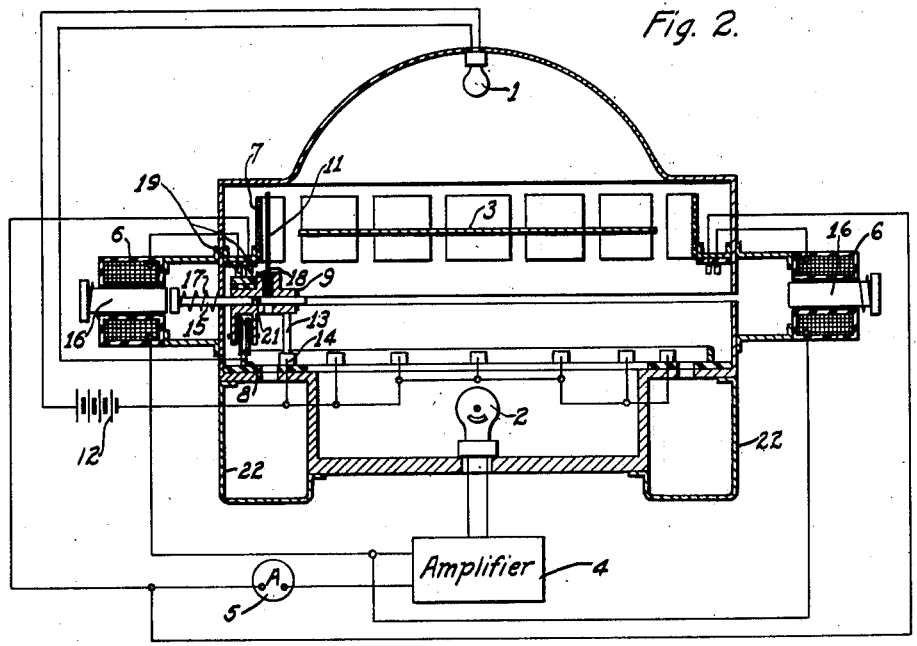
WITNESSES:
Leon M. Garman
Wm. C. Groome
INVENTOR
Floyd S. Wheeler.
BY F. W. Lyle.
ATTORNEY Patented Apr. 9, 1940

2,196,405

UNITED STATES PATENT OFFICE 2,196,405

DEVICE FOR MATCHING OR SORTING OBJECTS

Floyd S. Wheeler, Arlington, Va., assignor to Westinghouse Electric & Manufacturing Company, East Pittsburgh, Pa., a corporation of Pennsylvania Application September 23, 1937, Serial No. 165,300

9 Claims. (Cl. 209—111)

My invention relates to devices for matching or sorting objects in accordance with their color or shade. In particular, it relates to an arrangement for employing a single photo-electric cell for performing the operations of matching or sorting in accordance with color shade.

One object of my invention is to provide an arrangement whereby an object may be compared with a series of standards of color or shade, and an indication be given as to which of said series is most nearly similar to the object under examination.

Another object of my invention is to provide an arrangement whereby an object may be compared with a series of standards of color or shade and an indication given as to which of said series it most nearly resembles by means employing only a single photo-electric cell.

Another object of my invention is to provide an arrangement whereby a series of objects may be sorted and separated from each other in accordance with their color and their shade, by means of an apparatus employing only a single photo-electric cell.

Still another object of my invention is to provide an arrangement for matching or sorting objects in accordance with their color, which shall be simple and economical of construction and use.

Other objects of my invention will be made apparent by reading the following description, taken in connection with the drawing, in which Figure 1 shows an elevation in section of an apparatus embodying the principle of my invention; and, Fig. 2 shows an elevation in section, of a modification of the apparatus shown in Fig. 1.

It is frequently desirable for many practical purposes to be able to clarify objects in accordance with the color of their surfaces or the shade of said objects. For example, it is frequently desirable to match samples of cloth for similarity of color and shade. This is ordinarily done by eye but the results are frequently rather crude and inaccurate. It has been previously proposed to employ arrangements in which light from a single luminous source was caused to fall on a sample object to be treated and then to strike a photo-electric cell, the output current of which was dependent in magnitude upon the color or shade of the object. At the same time, light from the same source was caused to fall upon a standard surface of the same area as the sample, and then to strike a second photo-electric cell, made as nearly as possible identical with the first-mentioned photo-electric cell. The output current of the second photo-electric cell was then compared with that of the first photo-electric cell, and if the two were equal, the sample and the standard surface were supposed to be of the same color and shade.

One of the difficulties of such an arrangement was found to be the impossibility of finding photo-electric cells which would remain similar in electrical characteristics; that is to say, two photo-electric cells might be found which would on a particular day be sufficiently similar to give equal output currents when the test object and the standard were actually alike in color and shade, but in the course of a short time the relative output currents of these same photo-cells would change although all other conditions of the test remain unaltered.

In accordance with my invention, this difficulty of successfully matching photo-electric cells may be eliminated by the arrangement described below in which a single photo-electric cell and a single light source serve for both the test-sample and the color standard.

Referring particularly to Figure 1 of the drawing, I provide a light source 1 of any suitable intensity and color and a photo-electric cell 2 which are separated from each other by an opaque screen 3 which shields the cell 2 from the direct light of the source 1. The photo-electric cell is connected to a conventional amplifier 4, the output circuit of which may include an ammeter 5, and a relay-winding 6, the object of which will be explained more in detail in connection with Fig. 2. In a position to be struck by light from the source 1 and to transmit the light thereafter to the photo-cell 2 is arranged a color-standard 7, which has preferably the form of an annular wall, the line connecting the source 1 and the photo-cell 2 being the central axis of said annulus. The wall 7 is arranged to vary by degrees in color and shade in passing through a circuit around its circumference. For example, it may have the form of a paper ribbon having the successive colors of the rainbow starting with a deep red and passing through orange, yellow, green and blue to a deep violet and its other end. An alternative form which it may take is to comprise a succession of separate cards, which may even be separated slightly from each other at their adjacent edges, individual cards being of the same color throughout and area, but successive cards differing from each other in color in accordance with substantially equal gradations throughout the physical spectrum of light.

The above described color-standard would be suitable for the most general comparison of colors. In particular cases it may be more desirable to compare shades rather than colors, for example, to have the standard start in perfectly white, at one end and gradually shade through a gray to perfect blackness at the other end. Or, for such purposes as matching and sorting oranges in accordance with their degree of ripeness, the color-standard would start from the green color of an unripe orange at one end and progress through light yellow to the full color of a ripe orange at the other end.

Below the color-standard 7, I arrange an annular track or runway 8 on which a small carriage 9 may travel about the circumference of the annulus. On this carriage 9 may be supported a sample 11 of the material to be tested. The carriage 9 and the sample 11 should be arranged so that the latter passes as close as possible in front of the standard 7, and so that the sample intercepts the light exactly throughout the height of the standard 7 at any one point on the circumference of the annulus, but has a rather restricted length along this circumference.

Before the sample is mounted on the carriage 9, light from all portions above the circumference of the annular standard 7 will strike the photo-cell 2, and while, in general, equal areas of the standard 7 will not be responsible for equal increments of current in the output of photo-cell 2, the total output current of the latter will represent the integrated sum of the colors throughout the circumference of the annular standard 7. If now the sample 11 is slipped into place in front of some portion of the standard 7 from which it differs in color, the output current from the photo-cell 2 will be changed, and by an amount corresponding to the difference in color of the sample 11 from that portion of the standard 7 from which it screens the light of source 1.

If now the carriage 9 is caused to traverse alone the track 8, it will successively screen different portions of the standard 7, and the output current of the photo-cell 2 will continually vary, and its variations may be read upon the instrument 5. At some point in its travel about the circumference, the sample 11 will occupy a position directly in front of a portion of the standard 7 which has the same color and shade as itself. At that point it is obvious that the output current of the photo-cell 2 will have the same value as it had before the sample 11 was introduced. It is accordingly possible to determine when the sample 11 matches its background on the standard 7 by watching the current in the indicator 5 and noting when the latter reaches the same value it had before the sample 11 was introduced. It is thus possible, by noting the position of carriage 9, to tell the color and shade on the sector upon the standard 7 to which the sample corresponds.

If the standard 7 is a single continuous ribbon in which the colors or shades read into each other by absolutely imperceptible steps, as do the colors of light on the ordinary spectrum, there will, of course, be no single area of any width such as the sample 11 of necessity has, where the color of the standard is uniform throughout. In such cases, the position of the carriage 9 at which the current in instrument 5 corresponds with the value it had before the sample 11 was introduced will be that at which the average color on the portion of the standard 7 screen by sample 11 is equivalent to the color of the lamp. In order that this average should not represent the means of too wide a pair of color extremes, it is important that the circumferential width of the sample 11 should not be too great.

For many practical purposes it will be desirable, instead of making the standard 7 in the form of a continuous ribbon with infinitesimal gradations of color, to form it of a succession of areas of the same width as the sample 11, each such area being uniform in color throughout its extent.

The color gradations will then be in finite steps, and to attain highest accuracy it will be desirable to take the readings of the instrument 5 only when the sample 11 is exactly superposed upon one of these uniform sections of the standard 7. While this may be done by manually stopping the carriage 9 in those successive positions at which the sample 11 exactly covers one of the sections of standard 7, I have shown in Fig. 1 a convenient device for facilitating this process. For this purpose, I have arranged the circuit supplying the light source 1 from a battery 12 so that it includes a contact element 13 of narrow circumferential width which is carried by the carriage 9, and a succession of narrow contact elements 14 respectively located opposite the successive steps of the color standard 7. The contactor 13 is thus arranged so that it completes the circuit of source 1 only when the sample 11 is exactly superposed upon one or another of the sections of the color standard 7 and no readings of the instrument 5 are possible except when sample 11 stands exactly opposite one or another of the shade sections. With such an arrangement, it is possible to have the carriage 9 traverse at a uniform rate, provided it is not too rapid, the circumference of the track 8, and to note the successive readings of the instrument 5. When the latter passes through the same value it had before the sample 11 was inserted, then carriage 9 stands opposite that section of color-standard 7 which is similar to sample 11.

For many purposes it will be desirable, not only to indicate the match in color between the sample 11 and a section of the color-standard 7, but to sort different samples in accordance with their respective colors. An arrangement for this purpose is illustrated in Fig. 2. The carriage 9 is then provided with a sliding bottom 15 which is biased to closed position by a spring 17. Opposite each color-section of standard 7 is positioned a solenoid 6 having a core 16 arranged to be attracted radially inward against the bias of spring 17. The circuit of the solenoid 6 opposite to which the carriage 9 happens to stand at any time is completed by a bridging contact 18, insulatingly supported on the latter, which interconnects two brushes 19 in circuit with that solenoid. The member 15 is provided with a slot 21 adapted to register with the bottom of the sample 11, and to permit the latter to fall through it into one or another of a series of bins 22 when the current through the solenoid 6 has the value corresponding to a color-match between the sample 11 and the portion of the standard 7 over which it is superposed. In other words, there is one bin 22 for each section of the color standard 7.

A sample 11 is positioned on the carriage 9, and the latter is stated from one extreme of the color-standard 7 and moved in its circumferential track 8. As long as the color of the sample 11 fails to match that of the section of standard 7 in front of which it stands, the current through solenoid 6 will be different from the standard value which corresponds to a color-match, and the slot in the moving bottom 15 will not register with the sample 11. The latter will accordingly be supported in position to screen successive sections of standard 7. When, however, the sample 11 stands opposite the section of standard 7 which it matches, the slot in the bottom-member 15 will register with the base of sample 11 and the latter will fall through into one of the bins 22. In this way, by operating successively on any desired number of different samples 11, the latter may be distributed among the bins 22 to collect those of like color in the same bin.

It will be recognized that while I have described the sample 11 as of such shape as to fall through a slot, objects of other shapes such as cigars or oranges may have support on the carriage 9 and openings of corresponding shape in the bottom-member 15. It will also be recognized that the particular form of the mechanism described in Fig. 2 is merely exemplary, and that other arrangements which will be obvious to those skilled in the art for segregating samples of like color or shade may be substituted for the latter. It will also be recognized that while I have described the element 2 as a photo-electric cell, any device such as a selenium cell or a photovoltaic cell, or other arrangement having an output current which varies in accordance with the character of radiation incident upon it, may be employed in an analogous way when circumstances render such a substitution desirable. It will also be recognized that while I have described the standard 7 as a ribbon, or a succession of flat surfaces, it may be desirable in matching objects which are not flat to constitute the successive sections of the standard 7 of surfaces of the same form turned toward the source 1 and photo-cell 2, as those of the samples to be compared, for example, the section 7, where oranges are to be matched or sorted might comprise a succession of hemispheres of the same size as the average orange, but grading in color from that of the green to the ripe fruit. It will also be recognized to be possible to sort samples having a substantially uniform color for a variation in size by having the successive sections of the standard 7 comprise surfaces all of the same color but of different size, and which are surrounded by fields which do not reflect the radiation.

In accordance with the patent statutes, I have described a particular embodiment of the principles of my invention but various modifications of such embodiments will be readily apparent to those skilled in the art, and I, therefore, desire that the following claims shall be given the broadest interpretation of which they are capable in view of the limitations invoked by the prior art.

I claim as my invention:

1. In a color-matching device, a light source, a photo-electric device having a single output circuit, a screen having different colors positioned in different light-paths from said source to said device, said screen normally sending all said colors to said device, a sample positioned to intercept the light beam associated with one of said colors, and means operably responsive to a variation in the current in said circuit for indicating a color match between one of said colors and said sample.

2. In a color matching device, a light source, a photo-electric device having a single output circuit, a screen having different colors positioned successively in different light paths from said source to said device, said screen normally sending all said colors to said device, means for passing a sample to be tested past said screen to intercept the light beam associated with said colors successively, and means operably responsive to a variation in the current in said circuit for indicating a color match between one of said colors and said sample.

3. In a color matching device, a light source, a photo-electric device having a single output circuit, a screen having different colors positioned successively in different light paths from said source to said device, said screen normally sending all said colors to said device, means for passing samples to be tested past said screen to intercept the light beam associated with said colors successively, and means operably responsive to a variation in the current in said circuit for sorting said samples according to their color.

4. In a color matching device, a light source, a photo-electric device having a single output circuit, a screen having different colors positioned successively in different light paths from said source to said device, said screen normally sending all said colors to said device, means for passing samples to be tested past said screen to intercept the light beam associated with said colors successively, and means operably responsive to a variation in the current in said circuit produced by a variation in intensity of the light beam for classifying said samples into receptacles corresponding to the several colors on the color screen.

5. In combination, a source of radiations, a radiation responsive device having a single output circuit, means including a plurality of standard color screens receiving radiations from said source and sending radiations to said responsive device, a test color screen receiving radiations from said source and sending radiations to said responsive device, means for relatively moving said standard color screen and said test color screen to successively block out the radiations from said standard color screens until a color match is formed between one of said standard color screens and said test screen, and means responsive to a predetermined current in said circuit to classify said test screen according to its color.

6. In combination, a source of radiations, a radiation responsive device having a single output circuit, means including a plurality of standard color screens receiving radiations from said source and sending radiations to said responsive device, a test color screen receiving radiations from said source and sending radiations to said responsive device, means for relatively moving said standard color screen and said test color screen to successively block out the radiations from said standard color screens until a color match is formed between one of said standard color screens and said test screen, and means responsive to a predetermined current in said circuit to indicate a color match between said test screen and said one of said standard screens.

7. In combination, a source of radiations, a radiation responsive device having a single output circuit, means including a plurality of standard color screens receiving radiations from said source and sending radiations to said responsive device, a test color screen receiving radiations from said source and sending radiations to said responsive device, means for relatively moving said standard color screen and said test color screen to successively block out the radiations from said standard color screens until a predetermined color match is found between one of said standard color screens and said test screen, and means responsive to a predetermined current in said circuit to indicate the degree of color match between said screens.

8. In combination, a source of radiations, a radiation responsive device having a single output circuit, means including a plurality of standard color screens receiving radiations from said source and sending radiations to said responsive device, a test color screen receiving radiations from said source and sending radiations to said responsive device, means for relatively moving said standard color screen and said test color screen to successively block out the radiations from said standard color screens until a predetermined color match is found between one of said standard color screens and said test screen, and means responsive to a predetermined current in said circuit to classify said test screen according to a predetermined color match between the test screen and one of said standard screens.

9. In combination, a source of radiations, a radiation responsive device having a single output circuit, means including a plurality of standard color screens receiving radiations from said source and sending radiations to said responsive device, a test color screen receiving radiations from said source and sending radiations to said responsive device, means for relatively moving said standard color screen and said test color screen to successively block out a portion of the radiations from said standard color screens until a predetermined color match is found between one of said standard color screens and said test screen, and means responsive to a predetermined current in said circuit to indicate the degree of color match between said screens.

FLOYD S. WHEELER.